United States Patent [19]

Propst et al.

[11] 4,231,630
[45] Nov. 4, 1980

[54] UNDER THE WALL ENERGY SUPPLY SYSTEM FOR A SPACE DIVIDER SYSTEM

[75] Inventors: Robert L. Propst; Michael A. Wodka, both of Ann Arbor, Mich.

[73] Assignee: Herman Miller, Inc., Zeeland, Mich.

[21] Appl. No.: 32,523

[22] Filed: Apr. 23, 1979

[51] Int. Cl.³ .............................................. H02G 3/26
[52] U.S. Cl. .................................. 339/22 R; 52/221; 174/48
[58] Field of Search ...................... 339/22 R, 22 B, 23; 174/48, 49, 101; 52/220, 221, 242

[56] References Cited

U.S. PATENT DOCUMENTS

| | | | |
|---|---|---|---|
| 3,411,252 | 11/1968 | Boyle, Jr. .............................. | 52/242 |
| 4,037,900 | 7/1977 | Schmidger ............................ | 339/23 |
| 4,060,294 | 11/1977 | Haworth et al. .................. | 339/22 R |
| 4,133,153 | 1/1979 | Hage ..................................... | 52/220 |

*Primary Examiner*—Neil Abrams

*Attorney, Agent, or Firm*—Olsen and Stephenson

[57] ABSTRACT

An electrical supply system for use in a space divider system comprised of a plurality of upright wall panels arranged end to end to form a work station. Each wall panel is supported by depending legs in a position in which the lower edge of the panel is spaced above the floor. The energy supply system comprises a plurality of raceway sections containing electrical conductors and disposed below the panels adjacent their lower edges so as to provide an essentially unbroken appearance between the panels and the raceway sections. The lower edges of the raceway sections are located a predetermined distance above the floor to establish a clearance between the raceway sections and the floor where communications lines can be located. Side cover members are positioned on the floor along the lower edges of the raceway sections to conceal the clearance below the raceway sections.

7 Claims, 5 Drawing Figures

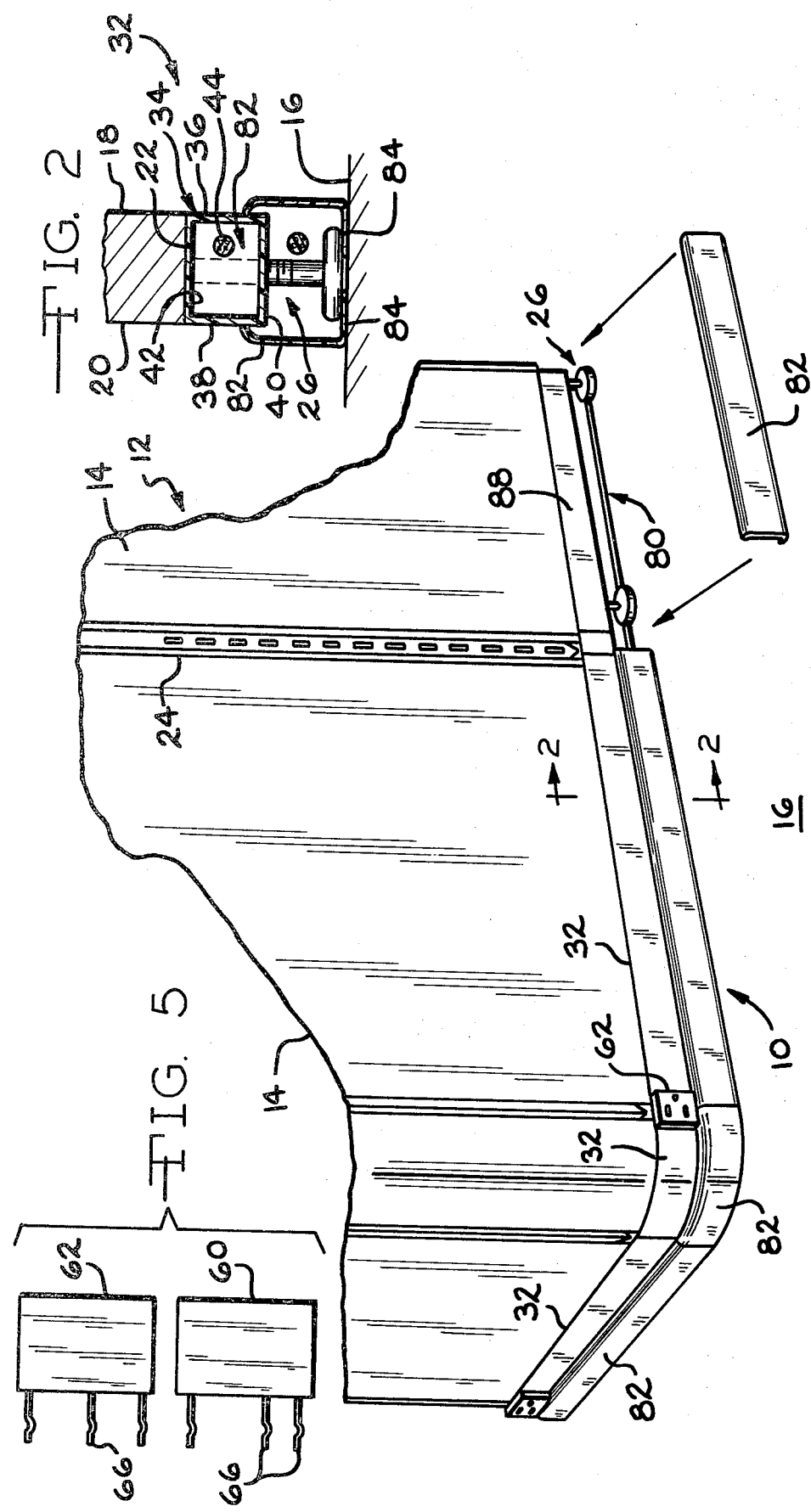

(Title and body of patent)

UNDER THE WALL ENERGY SUPPLY SYSTEM FOR A SPACE DIVIDER SYSTEM

BACKGROUND OF THE INVENTION

The present invention relates generally to space divider systems formed by movable wall panels, and more particularly, to an under the wall energy supply system for use in the space divider system.

Modular offices and work areas have gained widespread acceptance in a variety of office and work settings. Flexibility and low cost are but two of the many reasons given for converting from conventional permanent offices to modular offices. The success of portable space divider systems lies to a large extent in the ability to deliver the needed electrical energy and communications service to the various work stations within the space divider system. One method of providing such electrical and communication service is to prewire the wall panels which form the space divider system. However, such prewired panels are costly. Also, there is a need for an energy supply which can be installed in space divider systems having conventional wall panels.

It is the general object of this invention to provide an improved under the wall energy supply system for a space divider system.

SUMMARY OF THE INVENTION

In accordance with the present invention, an improved energy supply system is interfaced with a space divider system comprised of a plurality of wall panels arranged end to end on a supporting surface, such as a floor, to form office and work areas of desired size and configuration. The wall panels have depending leg supports supporting the panels in positions in which their lower legs are spaced above the floor.

The energy supply system includes raceway sections having electrical conductors for transmitting electrical energy. Each raceway section has a length corresponding to the length of an associated wall panel and is provided with connector units at its opposite ends enabling the interconnection of adjacent raceway sections. Each raceway section is disposed below its associated wall panel adjacent to the lower edge of the panel so as to provide an essentially unbroken appearance between the face of the wall panel and the raceway section.

The raceway sections are each mounted adjacent to the lower edge of the panel so that the lower edge of the raceway section is spaced a predetermined distance above the floor. The space between the raceway section and the floor is enclosed by side cover members that extend along the lower edges of the raceway sections to form an enclosed space in which the communication lines are located.

Also, filler sections having an outer configuration similar to the raceway sections are provided for positioning below those wall panels in which the use of raceway sections is not needed. Accordingly, each filler section and its associated wall panel provides an outward appearance that resembles the outward appearance of the wall panel and an attached raceway section. Consequently, each wall panel has a similar outward appearance.

Further objects, features and advantages of the present invention will become apparent from a consideration of the following description when taken in connection with the appended claims and the accompanying drawing in which:

FIG. 1 is a perspective view of a space divider system comprised of wall panels equipped with the energy supply and communications system of the present invention;

FIG. 2 is a sectional view of the energy supply and communications system of the present invention taken substantially from line 2—2 in FIG. 1;

FIG. 5 is a side elevational view of a pair of receptacle outlets.

Figure 3:
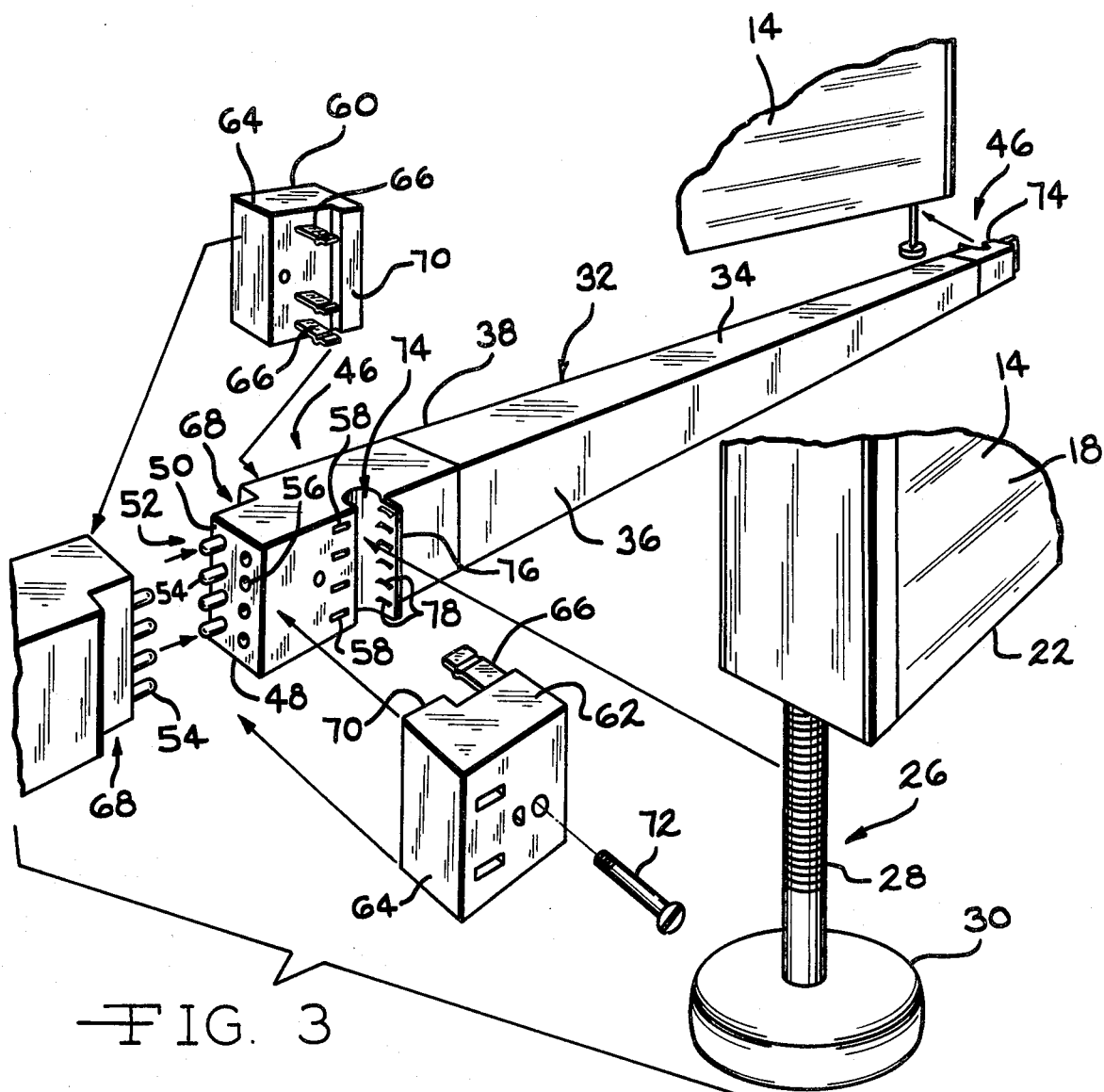
FIG. 3 is an exploded perspective view of a raceway section which forms a component of the energy supply and communications system of this invention.

Referring to the drawing, the energy supply system of this invention, indicated generally at 10, is shown in FIG. 1 installed in a space divider system 12 comprised of a plurality of upright movable wall panels 14 arranged end to end on a floor 16. Each wall panel 14 has opposite faces 18 and 20 extending longitudinally of the panel 41 and a lower edge 22 extending transversely between the faces 18 and 20 and longitudinally of the panel 14. Adjacent panels 14 are interconnected by connector strips 24 to provide a continuous wall construction and form a selected work or office station.

Depending leg supports 26 support each wall panel 14 in a position in which its lower edge 22 is spaced above the floor 16. As seen in FIG. 3, each leg support 26 comprises a threaded spindle 28 threadably mounted on the panel 14 at its lower edge 22. The leg 26 further includes a glide 30 mounted on the spindle 28 for supporting the panel 14 on the floor 16. The spindle 28 enables the height of the panel 14 to be varied relative to the floor 16 by selective rotation of the spindle relative to the wall panel 14.

The energy supply system 10 comprises a plurality of raceway sections 32 for transmitting electrical energy along the lower edges 22 of the panels 14. Each raceway section 32 as seen in FIGS. 2 and 3, consists of a hollow rectangular body 34 having opposite sidewalls 36 and 38, a bottom wall or edge 40 and a top wall 42. The body 34 houses a cable 44 having electrical conductors for transmitting electrical energy from one end of the raceway section 32 to its other end. Connector assemblies 46 are provided at each end of the raceway section 32, as seen in FIG. 3. Each connector assembly 46 has an end portion 48 terminating at an upright flat face 50. The end portion 48 carries a plurality of terminal units 52 each comprising a male portion 54 connected to a horizontally spaced female portion 56. The terminal units 52 are vertically spaced apart with the male portions 54 being vertically aligned and the female portions 56 also being vertically aligned. The terminal units 52 are connected to the conductors in the cable 44. One of the conductors forms a ground path, two conductors have the same polarity and the other conductor has the opposite polarity. This arrangement is disclosed in application Ser. No. 2,608, filed Jan. 11, 1979 and assigned to the assignee of the present application.

The connector assembly 46 of one raceway section 32 is connected to the connector assembly 46 of an adjacent raceway section 32 by interfitting corresponding terminal units 52. The terminal units 52 on the adjacent connector assemblies 46 are relatively inverted so that the male portions or prongs 54 on one connector assembly 46 are inserted into the female portion 56 on the adjacent connector assembly 46.

Implementation of the cable 44 with two conductors of the same polarity and another conductor of the opposite polarity in effect provides two independent circuits. As shown in FIG. 3, assume that the upper terminal unit 52 is connected to the ground conductor, the middle two terminal units 52 are connected to the positive conductors, and the bottom terminal unit 52 is connected to the negative conductor.

Each connector assembly 46 is provided with vertically spaced socket openings 58 facing sideways of the raceway section 32. The socket openings 58 have contacts connected to corresponding terminal units 52. Receptacle outlets 60 and 62 are associated with the raceway sections 32. Each receptacle outlet 60 and 62 has a main body 64 having three rearwardly extending prongs 66. The upper prong 66 connects to the ground terminal 52, the lower prong 66 connects to the negative terminal unit 52 and the middle prong 66 will, depending on its location, connect to one of the two positive terminal units 52.

As seen in FIG. 5, the middle prong 66 on the receptacle outlet 60 is positioned to engage the lower of the two positive terminal units 52 while the middle prong 66 on the receptacle outlet 62 is positioned slightly higher to be in a position to engage the upper positive terminal unit 52. Thus, the outlets 60 and 62 cooperate with the connector assemblies 46 to establish two independent circuits. A side recess 68 is formed in each connector assembly 46 and receives a rearwardly extending projection 70 on the receptacle outlet to aid in positioning and securing the outlet in place. Thus, the outlets 60 and 62, as viewed from above, have an L shape. A screw 72 extends through the receptacle outlet and is secured to the connector assembly 46 to fix the receptacle in place.

The raceway sections 32 are positioned adjacent the lower edges 22 of the wall panels 14. In the illustrated embodiment, the top wall 42 of each raceway section abuts the lower edge 22 of its associated panel 14. As a result, the close positioning of the raceway sections 32 against the wall panels 14 presents an unbroken appearance or continuous surface between the faces 18 and 20 of panels 14 and sidewalls 36 and 38 of the raceway sections 32 as the width of the raceway sections 32 is approximately equal to the distance between the wall faces 18 and 20.

As shown in FIG. 3, the raceway sections 32 are mounted on the spindles 28 of the leg supports 26. A pair of upright openings 74 are formed in each raceway section 32 and are spaced apart a distance equal to the distance between the leg supports 26 on each panel 14. The openings 74 open sideways of the sidewalls 36 and 38 of the raceway sections 32 enabling each raceway section 32 to be mounted and removed by its sideways movement relative to the wall panel 14. As a result, installation and removal of the raceway sections 32 can be achieved while the panels 14 are interconnected in their established positions.

A hingedly connected flap 76 is integrally formed with the connector assembly 46 and is provided with vertically spaced teeth 78 that engage the threads of the spindle 28 preventing vertical movement of the raceway section 32 when it is mounted on the spindles 28. After the spindle 28 is positioned in its associated opening 74, the flap 76 is pivoted to a closed position in which the teeth 78 are interposed between the threads securing the raceway section 32 against the lower edge 22 of the panel 14. The openings 74 can also be provided with vertically spaced teeth (not shown) which coact with the teeth 78 and the threads on the spindles 28 to secure the raceway section 32 against the lower edge 22 of the panel 14.

The raceway sections 32 are dimensioned so that their bottom walls 40 are positioned a predetermined distance above the floor 16 establishing a clearance or space 80 between the walls 40 and the floor 16. Side cover members 82, formed of resilient material such as plastic, are installed to extend upwardly from the floor 16 to a position in which their upper portions engage the sidewalls 36 and 38 of the raceway sections 32. The side cover members 82 have transverse anchor portions 84 which are interposed between the glides 30 and the floor 16 to secure the cover members 82 in a fixed position. The side cover members 82 substantially enclose the space 80 below the raceway sections 32 to conceal a communication cable 86 that is disposed in the space 80. Accordingly, installation of communication lines and their servicing is easily accomplished.

Figure 4:
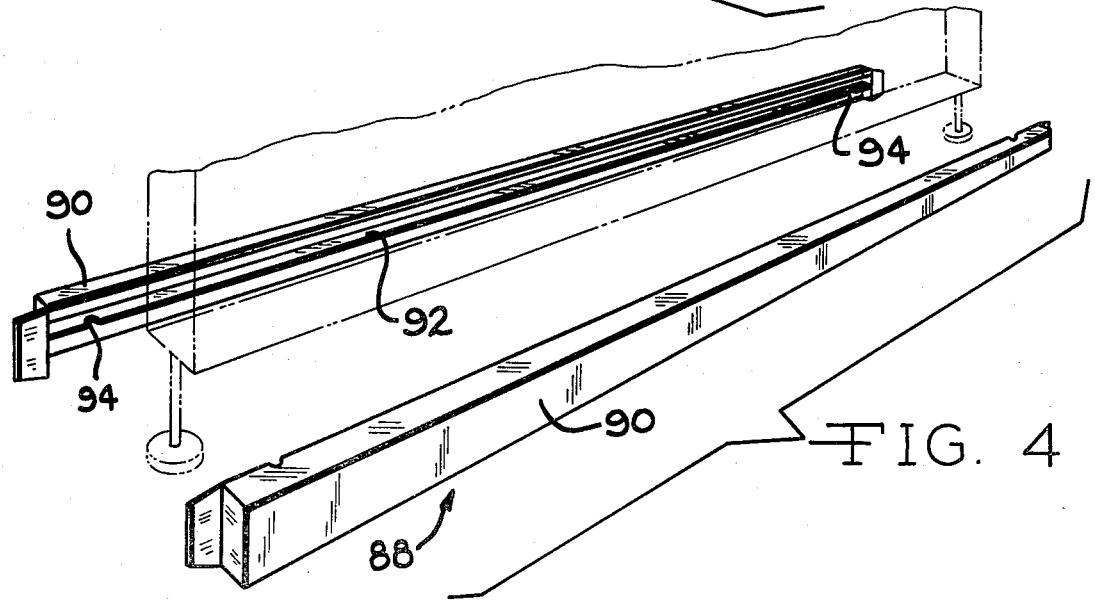
FIG. 4 is an exploded perspective view of a filler section adapted to be positioned below a wall panel of the space divider system.

In some instances, the configuration of the space divider system does not require that every wall panel 14 be equipped with a raceway section 32. Cost savings are realized through the use of filler sections 88, as seen in FIG. 4. The filler sections 88 have an outer shape and appearance which closely resembles the outer shape and appearance of the raceway sections 32. However, the filler sections 88 are hollow and are not equipped with an electrical cable 44 or connector assemblies 46. Each filler section 88 consists of a pair of section halves 90, each having an internal rib 92 into which a pair of longitudinally spaced curved recesses 94 are formed. When the section halves 90 are assembled, the portions of the ribs 92 defining the recesses 94 engage the threads of the spindles 28 to mount the filler sections 88 against the lower edges 22 of their associated panels 14. The filler sections 88 when positioned against the lower edges 22 of their associated panels 14 present an outward appearance similar to the outward appearance presented by a raceway section 32 and its associated wall panel 14. As shown in FIG. 1, the end panel 14 is equipped with a filler section 88 since for this particular arrangement, electrical power is not required near the end panel 14.

The raceway sections 32 and the filler sections 88 are shaped to correspond with the shape of the wall panel 14 under which they are positioned. As seen in FIG. 1, a curved raceway section 32 is disposed below its associated curved wall panel 14. Similarly, the cover members 82 are curved corresponding with the curvature of the wall panel 14 and the raceway section 32.

From the above description, it can be seen that an improved energy supply system is provided employing raceway sections 32 that are disposed adjacent the lower edges 22 of the wall panels 14 to provide the lower portions of the panels 14 with an unbroken appearance. The spaces below the raceway sections 32 are available for concealing communications lines which are easily installed and serviced. The system 10 is economical, easy to install and service, and provides an attractive appearance.

What is claimed:

1. In a space divider system which includes a plurality of upright wall panels arranged end-to-end, each of said panels having spaced apart opposite faces extending longitudinally of said panel between the ends thereof and a lower edge extending transversely between said faces and longitudinally of said panel between said ends, leg supports supporting each of said panels on a supporting surface in a position in which said lower edge is spaced a predetermined distance above said supporting surface, an energy supply system comprising a plurality of raceway sections disposed below selected ones of said panels, each of said raceway sections corresponding to one of said selected wall panels and containing electrical conductors for transmitting electrical energy along the lower edge of an associated wall panel, each of said raceway sections having sidewalls and a bottom wall and being disposed adjacent the lower edge of an associated panel to provide an essentially unbroken appearance between said raceway section sidewalls and said faces of said associated panel, the bottom wall of each of said raceway sections being disposed a predetermined distance above said supporting surface to establish a clearance between said bottom wall of said raceway section and said supporting surface, and cooperating releasable mounting means on each of said raceway sections and an associated wall panel enabling each of said raceway sections to be mounted on and demounted from said associated wall panel by movement of said raceway section as a single unit transversely of said associated wall panel so that a plurality of wall panels can be maintained in said end to end arrangement when said raceway sections are mounted and demounted from said upright wall panels.

2. The energy supply system according to claim 1, wherein each of said raceway sections includes connector assemblies disposed at opposite ends thereof and connected to said conductors, said connector assemblies on a pair of adjacent raceway sections being interconnected for transmitting electrical energy therebetween.

3. The energy supply system according to claim 1, and further including filler sections disposed adjacent the lower edges of the remaining ones of said wall panels, each of said filler sections having an external configuration similar to the external configuration of said raceway sections, said filler sections each cooperating with an associated wall panel to provide an outward appearance similar to the outward appearance provided by a raceway section and an associated panel.

4. The energy supply system according to claim 3, wherein each of said filler sections includes separable portions having mounting means engageable with said leg supports on an associated panel to mount said filler sections adjacent the lower edge of said associated panel.

5. The energy supply system according to claim 1, wherein said side cover means includes a pair of side cover members for each of said panels, said side cover members positioned adjacent said opposite sidewalls of each of said raceway sections.

6. The energy supply system according to claim 5, wherein each of said side cover members includes anchor portions interposed between said leg supports and said supporting surface to fix said side cover members relative to said raceway sections.

7. In a space divider system which includes a plurality of upright wall panels arranged end-to-end, each of said panels having opposite faces extending longitudinally of said panels and a lower edge extending transversely between said faces and longitudinally of said panel, leg supports supporting each of said panels on a supporting surface in a position in which said lower edge is spaced a predetermined distance above said supporting surface, an energy supply system comprising a plurality of raceway sections disposed below selected ones of said panels, each of said raceway sections corresponding to one of said selected wall panels and containing electrical conductors for transmitting electrical energy, each of said raceway sections having sidewalls and a lower edge and being disposed adjacent the lower edge of an associated panel to provide an essentially unbroken appearance between said raceway section sidewalls and said faces of said associated panel, the lower edge of each of said raceway sections being disposed a predetermined distance above said supporting surface to establish a clearance between said lower edge of said raceway section and said supporting surface, releasable means on each of said raceway sections and an associated panel mounting said raceway section on said associated panel, said releasable mounting means being operable to enable mounting and demounting of said raceway section by movement of said raceway section transversely with respect to said associated wall panel, and side cover means extending between said supporting surface and said raceway sections adjacent the sidewalls thereof to define a concealed space beneath said raceway sections, said releasable mounting means including means on each of said raceway sections engageable with said leg supports on an associated panel to mount said raceway section adjacent the lower edge of said associated panel.

* * * * *